(12) United States Patent
Nagata et al.

(10) Patent No.: US 8,732,663 B2
(45) Date of Patent: May 20, 2014

(54) SYSTEM, METHOD AND COMPUTER PROGRAM PRODUCT FOR PROVIDING AUTOMATED TESTING BY UTILIZING A PRECONFIGURED POINT OF ENTRY IN A TEST OR BY CONVERTING A TEST TO A PREDEFINED FORMAT

(75) Inventors: Yudi Nagata, San Francisco, CA (US); Luis Maya, Palo Alto, CA (US); Cheryl Porro, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 208 days.

(21) Appl. No.: 13/019,281

(22) Filed: Feb. 1, 2011

(65) Prior Publication Data

US 2011/0209121 A1    Aug. 25, 2011

Related U.S. Application Data

(60) Provisional application No. 61/307,774, filed on Feb. 24, 2010, provisional application No. 61/309,724, filed on Mar. 2, 2010.

(51) Int. Cl.
*G06F 9/44*    (2006.01)

(52) U.S. Cl.
USPC .......................................................... 717/124

(58) Field of Classification Search
None
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |

(Continued)

OTHER PUBLICATIONS

U.S. Appl. No. 60/828,192, filed Oct. 4, 2006.

*Primary Examiner* — Don Wong
*Assistant Examiner* — Daxin Wu
(74) *Attorney, Agent, or Firm* — Zilka-Kotab, PC

(57) ABSTRACT

In accordance with embodiments, there are provided mechanisms and methods for automated testing which utilizes a preconfigured point of entry in a test or which includes a test converted to a predetermined format. These mechanisms and methods for automated testing which utilizes a preconfigured point of entry in a test or which includes a test converted to a predetermined format can provide testing in an automated manner where the testing is otherwise typically performed manually. The ability to provide this automated testing can increase the efficiency of testing code.

10 Claims, 10 Drawing Sheets

(56) References Cited

U.S. PATENT DOCUMENTS

| | | | |
|---|---|---|---|
| D454,139 S | 3/2002 | Feldcamp | |
| 6,367,077 B1 | 4/2002 | Brodersen et al. | |
| 6,393,605 B1 | 5/2002 | Loomans | |
| 6,405,220 B1 | 6/2002 | Brodersen et al. | |
| 6,434,550 B1 | 8/2002 | Warner et al. | |
| 6,446,089 B1 | 9/2002 | Brodersen et al. | |
| 6,535,909 B1 | 3/2003 | Rust | |
| 6,549,908 B1 | 4/2003 | Loomans | |
| 6,553,563 B2 | 4/2003 | Ambrose et al. | |
| 6,560,461 B1 | 5/2003 | Fomukong et al. | |
| 6,574,635 B2 | 6/2003 | Stauber et al. | |
| 6,577,726 B1 | 6/2003 | Huang et al. | |
| 6,601,087 B1 | 7/2003 | Zhu et al. | |
| 6,604,117 B2 | 8/2003 | Lim et al. | |
| 6,604,128 B2 | 8/2003 | Diec | |
| 6,609,150 B2 | 8/2003 | Lee et al. | |
| 6,621,834 B1 | 9/2003 | Scherpbier et al. | |
| 6,654,032 B1 | 11/2003 | Zhu et al. | |
| 6,665,648 B2 | 12/2003 | Brodersen et al. | |
| 6,665,655 B1 | 12/2003 | Warner et al. | |
| 6,684,438 B2 | 2/2004 | Brodersen et al. | |
| 6,711,565 B1 | 3/2004 | Subramaniam et al. | |
| 6,724,399 B1 | 4/2004 | Katchour et al. | |
| 6,728,702 B1 | 4/2004 | Subramaniam et al. | |
| 6,728,960 B1 | 4/2004 | Loomans | |
| 6,732,095 B1 | 5/2004 | Warshavsky et al. | |
| 6,732,100 B1 | 5/2004 | Brodersen et al. | |
| 6,732,111 B2 | 5/2004 | Brodersen et al. | |
| 6,754,681 B2 | 6/2004 | Brodersen et al. | |
| 6,763,351 B1 | 7/2004 | Subramaniam et al. | |
| 6,763,501 B1 | 7/2004 | Zhu et al. | |
| 6,768,904 B2 | 7/2004 | Kim | |
| 6,772,229 B1 | 8/2004 | Achacoso et al. | |
| 6,782,383 B2 | 8/2004 | Subramaniam et al. | |
| 6,804,330 B1 | 10/2004 | Jones et al. | |
| 6,826,565 B2 | 11/2004 | Ritchie et al. | |
| 6,826,582 B1 | 11/2004 | Chatterjee et al. | |
| 6,826,745 B2 | 11/2004 | Coker et al. | |
| 6,829,655 B1 | 12/2004 | Huang et al. | |
| 6,842,748 B1 | 1/2005 | Warner | |
| 6,850,895 B2 | 2/2005 | Brodersen et al. | |
| 6,850,949 B2 | 2/2005 | Warner et al. | |
| 6,993,747 B1 * | 1/2006 | Friedman | 717/124 |
| 7,000,224 B1 * | 2/2006 | Osborne et al. | 717/125 |
| 7,055,067 B2 * | 5/2006 | DiJoseph | 714/38.1 |
| 7,062,502 B1 | 6/2006 | Kesler | |
| 7,191,326 B2 * | 3/2007 | Louden et al. | 713/1 |
| 7,209,929 B2 | 4/2007 | Dominguez, Jr. et al. | |
| 7,299,382 B2 * | 11/2007 | Jorapur | 714/38.14 |
| 7,340,411 B2 | 3/2008 | Cook | |
| 7,356,482 B2 | 4/2008 | Frankland et al. | |
| 7,401,094 B1 | 7/2008 | Kesler | |
| 7,401,323 B2 * | 7/2008 | Stall et al. | 717/130 |
| 7,412,455 B2 | 8/2008 | Dillon | |
| 7,451,350 B2 * | 11/2008 | Cherny et al. | 714/32 |
| 7,620,655 B2 | 11/2009 | Larsson et al. | |
| 7,698,160 B2 | 4/2010 | Beaven et al. | |
| 7,721,262 B2 * | 5/2010 | Reinhardt | 717/124 |
| 7,725,772 B2 * | 5/2010 | Proto | 714/38.14 |
| 7,870,432 B2 * | 1/2011 | Adler et al. | 717/124 |
| 8,015,495 B2 | 9/2011 | Achacoso et al. | |
| 8,082,301 B2 | 12/2011 | Ahlgren et al. | |
| 8,095,413 B1 | 1/2012 | Beaven | |
| 8,095,594 B2 | 1/2012 | Beaven et al. | |
| 8,146,059 B2 * | 3/2012 | Ponsford et al. | 717/124 |
| 8,275,836 B2 | 9/2012 | Beaven et al. | |
| 8,484,111 B2 | 7/2013 | Frankland et al. | |
| 2001/0044791 A1 | 11/2001 | Richter et al. | |
| 2002/0022986 A1 | 2/2002 | Coker et al. | |
| 2002/0029161 A1 | 3/2002 | Brodersen et al. | |
| 2002/0029376 A1 | 3/2002 | Ambrose et al. | |
| 2002/0035577 A1 | 3/2002 | Brodersen et al. | |
| 2002/0042264 A1 | 4/2002 | Kim | |
| 2002/0042843 A1 | 4/2002 | Diec | |
| 2002/0072951 A1 | 6/2002 | Lee et al. | |
| 2002/0082892 A1 | 6/2002 | Raffel et al. | |
| 2002/0091968 A1 * | 7/2002 | Moreaux et al. | 714/38 |
| 2002/0129352 A1 | 9/2002 | Brodersen et al. | |
| 2002/0140731 A1 | 10/2002 | Subramaniam et al. | |
| 2002/0143997 A1 | 10/2002 | Huang et al. | |
| 2002/0162090 A1 | 10/2002 | Parnell et al. | |
| 2002/0165742 A1 | 11/2002 | Robins | |
| 2003/0004971 A1 | 1/2003 | Gong et al. | |
| 2003/0018705 A1 | 1/2003 | Chen et al. | |
| 2003/0018830 A1 | 1/2003 | Chen et al. | |
| 2003/0066031 A1 | 4/2003 | Laane | |
| 2003/0066032 A1 | 4/2003 | Ramachandran et al. | |
| 2003/0069936 A1 | 4/2003 | Warner et al. | |
| 2003/0070000 A1 | 4/2003 | Coker et al. | |
| 2003/0070004 A1 | 4/2003 | Mukundan et al. | |
| 2003/0070005 A1 | 4/2003 | Mukundan et al. | |
| 2003/0074418 A1 | 4/2003 | Coker | |
| 2003/0120675 A1 | 6/2003 | Stauber et al. | |
| 2003/0151633 A1 | 8/2003 | George et al. | |
| 2003/0159136 A1 | 8/2003 | Huang et al. | |
| 2003/0187921 A1 | 10/2003 | Diec | |
| 2003/0189600 A1 | 10/2003 | Gune et al. | |
| 2003/0204427 A1 | 10/2003 | Gune et al. | |
| 2003/0206192 A1 | 11/2003 | Chen et al. | |
| 2003/0225730 A1 | 12/2003 | Warner et al. | |
| 2003/0233404 A1 | 12/2003 | Hopkins | |
| 2004/0001092 A1 | 1/2004 | Rothwein et al. | |
| 2004/0010489 A1 | 1/2004 | Rio | |
| 2004/0015981 A1 | 1/2004 | Coker et al. | |
| 2004/0027388 A1 | 2/2004 | Berg et al. | |
| 2004/0128001 A1 | 7/2004 | Levin et al. | |
| 2004/0168106 A1 * | 8/2004 | Cherny et al. | 714/32 |
| 2004/0181713 A1 * | 9/2004 | Lambert | 714/48 |
| 2004/0186860 A1 | 9/2004 | Lee et al. | |
| 2004/0193510 A1 | 9/2004 | Catahan, Jr. et al. | |
| 2004/0199489 A1 | 10/2004 | Barnes-Leon et al. | |
| 2004/0199536 A1 | 10/2004 | Barnes Leon et al. | |
| 2004/0199543 A1 | 10/2004 | Braud et al. | |
| 2004/0249854 A1 | 12/2004 | Barnes-Leon et al. | |
| 2004/0260534 A1 | 12/2004 | Pak et al. | |
| 2004/0260659 A1 | 12/2004 | Chan et al. | |
| 2004/0268299 A1 | 12/2004 | Lei et al. | |
| 2005/0050555 A1 | 3/2005 | Exley et al. | |
| 2005/0065925 A1 | 3/2005 | Weissman et al. | |
| 2005/0091098 A1 | 4/2005 | Brodersen et al. | |
| 2005/0223022 A1 | 10/2005 | Weissman et al. | |
| 2005/0268285 A1 * | 12/2005 | Bagley et al. | 717/124 |
| 2005/0283478 A1 | 12/2005 | Choi et al. | |
| 2006/0117222 A1 * | 6/2006 | Shen et al. | 714/38 |
| 2006/0206834 A1 | 9/2006 | Fisher et al. | |
| 2007/0022407 A1 * | 1/2007 | Givoni et al. | 717/124 |
| 2007/0240127 A1 * | 10/2007 | Roques et al. | 717/136 |
| 2008/0109794 A1 * | 5/2008 | Adams et al. | 717/130 |
| 2008/0120602 A1 * | 5/2008 | Comstock et al. | 717/125 |
| 2008/0249972 A1 | 10/2008 | Dillon | |
| 2008/0270841 A1 * | 10/2008 | Quilter | 714/38 |
| 2009/0024874 A1 * | 1/2009 | Proto | 714/38 |
| 2009/0049102 A1 * | 2/2009 | Weissman | 707/104.1 |
| 2009/0063415 A1 | 3/2009 | Chatfield et al. | |
| 2009/0077539 A1 * | 3/2009 | Booth | 717/124 |
| 2009/0199096 A1 * | 8/2009 | Pop-Jordanov et al. | 715/704 |
| 2009/0265689 A1 * | 10/2009 | Gooi et al. | 717/124 |
| 2009/0313512 A1 * | 12/2009 | Jing et al. | 714/719 |
| 2011/0041123 A1 * | 2/2011 | Abadi et al. | 717/155 |
| 2011/0047529 A1 * | 2/2011 | Randimbivololona | 717/124 |
| 2011/0055813 A1 * | 3/2011 | Calendino et al. | 717/124 |
| 2011/0088014 A1 * | 4/2011 | Becker et al. | 717/125 |

* cited by examiner

```
public void run(BaseTest test, PackageTypeEnum packageType) throws Exception {
    setupEnvironment(test);
    setupOrgPerms();
    try {
        List<String> toBeAdded = createComponentsToBePackaged();
        if(toBeAdded!=null)
            toBeCleaned.addAll(toBeAdded);
        this.projectId = createPackage(toBeAdded, packageType);
        assertCreatedPackage();
        exportPackage(packageType);
        assertExportedPackage();
        destMgr = createDestinationOrg();
        installPackage(packageType);
        assertInstalledPackage();
        updateOriginalPackage();
        assertUpdatedPackage();
        exportNewVersionPackage(packageType);
        installNewVersionPackage();
        assertUpgradedPackage();
    }
    finally {
        cleanUp(projectId, BaseAppExchangeTest.DEST_KEY);
    }
}
```

302 → (code annotations)
304 → (code annotations)
300

FIGURE 3

SYSTEM, METHOD AND COMPUTER PROGRAM PRODUCT FOR PROVIDING AUTOMATED TESTING BY UTILIZING A PRECONFIGURED POINT OF ENTRY IN A TEST OR BY CONVERTING A TEST TO A PREDEFINED FORMAT

CLAIM OF PRIORITY

This application claims the benefit of U.S. Provisional Patent Application 61/307,774 entitled "Integration Test Automation," by Yudi Nagata, filed Feb. 24, 2010 and U.S. Provisional Patent Application 61/309,724, entitled "Method And System For Executing And Reporting Cloud Based Automated Functional Tests," by Nagata et al., filed Mar. 2, 2010, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

One or more implementations relate generally to testing code.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Tests are conventionally performed on code for validating the code, including, for example, validating functionality of the code. Unfortunately, tests are oftentimes performed manually, particularly where the code to be tested is complex such that an automated test is difficult, time consuming, labor intensive, etc. to create, For example, where the test is utilized for validating code have portions each drafted by various different developers, generating the test typically requires input from each of the developers. Specifically, each of the developers may write the code for testing the portion of the code with which they are associated. Furthermore, a change in one section of the test made by one of the developers may affect another section of a test written by another one of the developers.

As another example, automated tests written by a developer may be run by that developer, such that the test may be written in a coding language, or may otherwise utilize data, specific to the developer. However, these tests may also be desired to be run by another entity for validating the code, where such other entity does not necessarily support the coding language or. have access to the data specific to the developer. Thus, the other entity is oftentimes limited to manually testing the code based on test cases indicated by the developer.

Accordingly, it is desirable to provide techniques enabling the automation of tests in situations where the tests are typically performed manually, to improve efficiency of the testing.

BRIEF SUMMARY

In accordance with embodiments, there are provided mechanisms and methods for automated testing which utilizes a preconfigured point of entry in a test or which includes a test converted to a predetermined format. These mechanisms and methods for automated testing which utilizes a preconfigured point of entry in a test or which includes a test converted to a predetermined format can enable embodiments to provide testing in an automated manner where the testing is otherwise typically performed manually. The ability of embodiments to provide this automated testing can increase the efficiency of testing code.

In an embodiment and by way of example, a method for automated testing which utilizes a preconfigured point of entry in a test is provided. In use, a test having a sequence of steps indicative of a scenario is identified, Additionally, in the test, a preconfigured point of entry associated with at least one of the steps is identified. Further, code is inserted in the test utilizing the preconfigured point of entry for use in automatically testing at least one aspect associated with the at least one of the steps.

In another embodiment and by way of example, a method for automated testing which includes a test converted to a predetermined format is provided. In use, a test is received. In addition, the test is converted to a predefined format. Still yet, automated testing is of functional aspects of a graphical user interface is performed, utilizing the converted test.

While one or more implementations and techniques are described with reference to an embodiment in which automated testing which utilizes a preconfigured point of entry in a test or which includes a test converted to a predetermined format is implemented in a system having an application server providing a front end for an on-demand database service capable of supporting multiple tenants, the one or more implementations and techniques are not limited to multitenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples, the one or more implementations are not limited to the examples depicted in the figures.

FIG. 3 illustrates code representing a test template having a plurality of preconfigured points of entry capable of being utilized for customizing a test, in accordance with an embodiment;

DETAILED DESCRIPTION

General Overview

Systems and methods are provided for automated testing which utilizes a preconfigured point of entry in a test or which includes a test converted to a predetermined format.

As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system.

Next, mechanisms and methods for providing automated testing lich utilizes a preconfigured point of entry in a test or which includes a test converted to a predetermined format will be described with reference to example embodiments.

Figure 1:
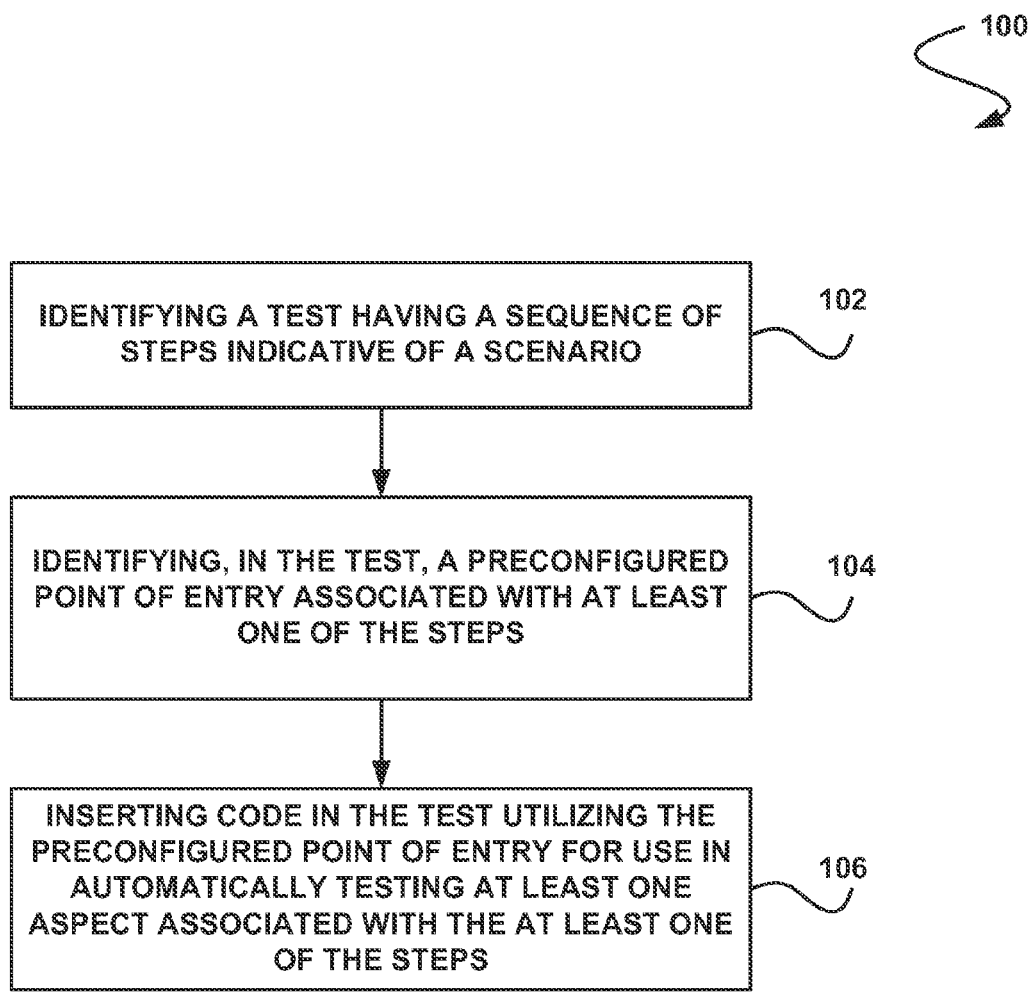
FIG. 1 illustrates a method for automated testing which utilizes a preconfigured point of entry in a test, in accordance with an embodiment.

FIG. 1 illustrates a method 100 for automated testing which utilizes a preconfigured point of entry in a test, in accordance with an embodiment. As shown in operation 102, a test having a sequence of steps indicative of a scenario is identified. With respect to the present description, the test includes any code capable of being executed for testing purposes, including testing other code such as applications, graphical user interfaces (GUIs), etc.

As noted above, the test includes a sequence of steps indicative of a scenario. In one embodiment, the scenario may include the scenario to be tested via the test. Just by way of example, the scenario may include the lifecycle of a package (e.g. application, etc.), such as the creation, provisioning of user access, version uploading, installation, uninstallation, etc. of the package. Of course, it should be noted that the scenario may include any functionality having a series of steps capable of being deployed for use by users, applications, etc.

To this end, the steps may include code implementing the scenario, such as functions within the scenario (e.g. functions for effectuating the scenario). For example, each of the steps may include a different function of the code implementing the scenario. As another example, the steps may access data in a database or other data external to the test during execution of the steps. In one embodiment, the steps may simulate the scenario, for example, as it would otherwise occur for use by users, applications, etc. In the above example of the package lifecycle, the steps may include the creation, provisioning of user access, version uploading, installation, uninstallation, etc. of the package.

While the test includes the sequence of steps indicative of the scenario, the test may also be utilized for testing the code implementing the scenario. For example, the test may include the steps indicative of the scenario and code for testing such steps. In this way, the test may be utilized for testing the steps within the test that are indicative of the scenario.

As an option, the test may include a test template. In one embodiment, the test template may be specific to the scenario. For example, the test template may have the sequence of steps indicative of the scenario, and may further be configured for testing the sequence of steps, as described in more detail below.

Additionally, in the test, a preconfigured point of entry associated with at least one of the steps is identified. Note operation 104. In the context of the present description, the preconfigured point of entry includes any preconfigured location within the test (i.e. point in time during execution of the test) that may be utilized for testing in association with at least one of the steps in the test. Thus, the preconfigured point of entry may be specifically utilized for testing the one or more steps with which it is associated, In one embodiment, the preconfigured point of entry may be associated with only the step that is immediately prior to the preconfigured point of entry in the test, such that the preconfigured point of entry may be utilized for testing only the step that is immediately prior to the preconfigured point of entry in the test. In another embodiment, the preconfigured point of entry may be associated with only the steps that are prior to the preconfigured point of entry in the test, such that the preconfigured point of entry may be utilized for testing any of the steps that are prior to the preconfigured point of entry in the test. It should be noted that in another embodiment, the test may include a plurality of preconfigured points of entry, each associated with a different one of the steps. Accordingly, the preconfigured point of entry may be associated with at least one of the steps by being subsequent to such step(s) during execution of the test.

Optionally, the preconfigured point of entry may include a configurable function. For example, the preconfigured point of entry may include may include a named function within the test which is empty. Moreover, as described below, code may be inserted into the empty function for causing execution of the code in response to a call to the function. Such code may include code for testing the step with which the preconfigured point of entry is associated.

Further, as shown in operation 106, code is inserted in the test utilizing the preconfigured point of entry for use in automatically testing at least one aspect associated with the at least one of the steps. Thus, the code may include any executable code capable of being executed to test the step(s) with which the preconfigured point of entry is associated. In one embodiment, the code may be inserted in the test utilizing the preconfigured point of entry by modifying a function associated with the preconfigured point of entry (e.g. the function which is the preconfigured point of entry) to include the code.

It should be noted that once inserted into the test, the code may be utilized to test any aspect associated with the step(s) with which the preconfigured point of entry is associated. In one embodiment, the aspect tested via the code may include a functional aspect of the step(s). For example, in the embodiment where the scenario being tested is the lifecycle of a package, the aspect may include whether the package is correctly created, whether a version of the package is correctly uploaded, whether access permissions correctly allow access to the package, whether the package installs correctly, whether the package uninstalls correctly, etc.

To this end, execution of the test may result in automatic execution of the steps in the test that are indicative of the scenario and automatic execution of the code inserted in the test utilizing the preconfigured point of entry for testing the associated step(s). By including the preconfigured point of entry in the test for use in inserting code to be utilized for testing purposes, any user may insert testing code into the test using the preconfigured point of entry, even where the user is not necessarily familiar with the code implementing each (i.e. all) of the steps in the test.

For example, where multiple different teams of developers each develop a different step in the scenario, each of such teams may also develop the code for testing the step that they developed, and may insert the code in the test using the preconfigured point of entry associated with such step. Thus, individual features (i.e. steps) developed independently may be tested in an integrated manner, without necessarily integrating the features themselves, utilizing the single test. Similarly, a step in the test may change (i.e. be modified) without affecting the validity of testing code inserted using preconfigured points of entry that are not necessarily associated with such step.

As an option, the steps indicative of the scenario may be implemented in the test using abstract classes. For example, the abstract classes may contain the sequence of steps. As another option, code inserted in the test using the preconfigured point of entry may further customize the step associated with the preconfigured point of entry, such as by overriding the functionality of the step. In this way, a scenario indicated by the steps may be changed using code inserted at the preconfigured point of entry which changes the steps associated therewith, such that the scenario being tested may be changed without having to re-write and implement and entirely new test.

To this end, the test may provide: ease of use by allowing test writers from different development teams to easily understand the scenario being tested; protocol correctness (i.e. test validity) by allowing the testers to be unfamiliar with the sequence of steps: maintainability in that changes to the test that impacted the scenario may be contained in a limited number of the steps; and/or coverage of different scenarios by allowing the steps to be customized via code inserted at the preconfigured point of entry.

Figure 2:
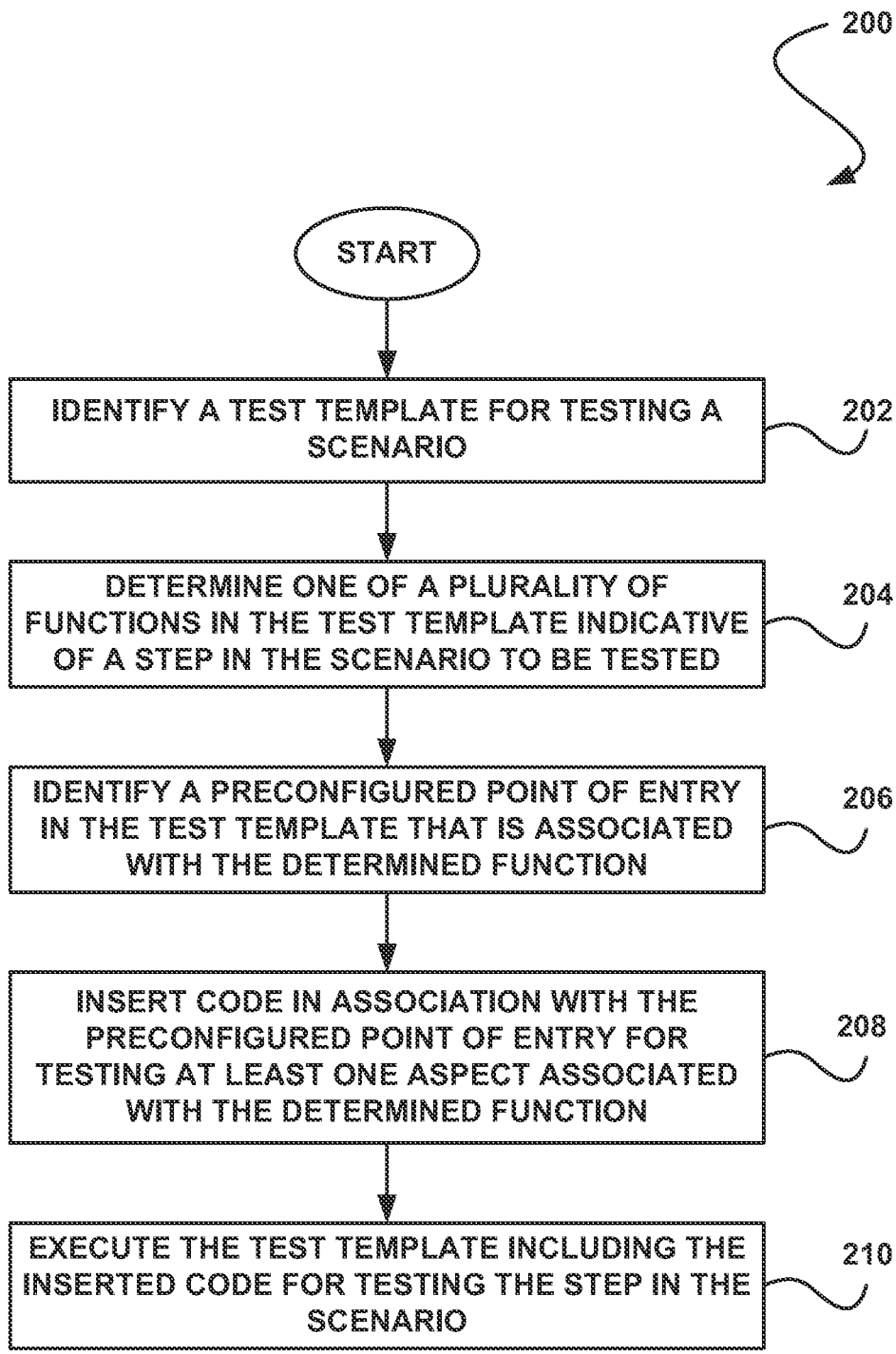
FIG. 2 illustrates a method for customizing a test template utilizing a preconfigured point of entry in the test template, in accordance with an embodiment.

FIG. 2 illustrates a method 200 for customizing a test template utilizing a preconfigured point of entry in the test template, in accordance with an embodiment. As an option, the present method 200 may be carried out in the context of the functionality of FIG. 1. Of course, however, the method 200 may be carried out in any desired environment. Again, the aforementioned definitions may apply during the present description.

As shown in operation 202, a test template for testing a scenario is identified. With respect to the present embodiment, the test template may be identified in response to a determination by a user of a scenario that is to be tested. Thus, the test template may be specific to the scenario (i.e. for testing the scenario).

Additionally, one of a plurality of functions in the test template indicative of a step in the scenario to be tested is determined. Note operation 204. In one embodiment, a plurality of functions (or in another embodiment classes) may be included in the test template, each associated with a different step in the scenario. As noted above, the function associated with one of the steps that is to be tested may be determined. For example, the function may be determined in response to a determination that code for testing the associated step is desired to be incorporated into the test.

Furthermore, as shown in operation 206, a preconfigured point of entry in the test template that is associated with the determined function is identified. Optionally, the preconfigured point of entry may be identified in response to a determination that, within the test, the preconfigured point of entry immediately follows the function in sequence. As another option, the preconfigured point of entry may be identified using comments within the test and/or any other documentation indicating that the preconfigured point of entry is associated with the determined function.

Once the preconfigured point of entry in the test template that is associated with the determined function is identified, code is inserted in the test in association with the preconfigured point of entry for testing at least one aspect associated with the determined function. Note operation 208. To this end, the code may include any code capable of testing an aspect associated with the determined function, such as a functionality of the determined function, a result of execution of the determined function, etc. In one embodiment, the code may be inserted in the test in association with the preconfigured point of entry by configuring the preconfigured point of entry to include the code, such that execution of the preconfigured point of entry results in execution of the code, Still yet, the test template is executed including the inserted code for testing the step in the scenario, as shown in operation 210. Executing the test template may include executing functions in the test template that include a sequence of steps indicative of the scenario. Executing the test template may also include executing the code for testing the step in the scenario with which the preconfigured point of entry is associated.

In one exemplary embodiment, a scenario for developing and distributing an application may be tested utilizing a test template specific to the scenario. The test template may therefore include steps indicative of the development and distribution of the application. For example, the test template may include functions for simulating the steps of creating an application, uploading the application to a location which allows access to the application, installing the application, extending functionality of the application, and installing the extended functionality.

Furthermore, the test template may have a different preconfigured point of entry associated with each of the steps. For example, each of the preconfigured point of entry may immediately and sequentially follow the step with which it is associated. In addition, each of the preconfigured points of entry may be configured to include code for testing the step with which it is associated. Just by way of example, the preconfigured point of entry associated with the step of creating an application may be configured to include code for testing that a user is able to create an application consisting of various components (e.g. provided by a multi-tenant on-demand database system by which the application is to be deployed for use by users); the preconfigured point of entry associated with the step of uploading the application to a location which allows access to the application may be configured to include code for testing that once the application has been created the application can be uploaded (e.g. to the multi-tenant on-demand database system) which can then be shared with users (e.g. of the multi-tenant on-demand database system); the preconfigured point of entry associated with the step of installing the application may be configured to include code for testing that users can search for the application (e.g. in a registry of the multi-tenant on-demand database system) and can then install the application; the preconfigured point of entry associated with the step of extending functionality of the application may be configured to include code for testing that users can extend the installed application and bundle that as a new application; and the preconfigured point of entry associated with the step of installing the extended functionality may be configured to include code for testing that uses will have to install both the original version of the application and the version of the application with the extended functionality to make use of the extended functionality.

FIG. 3 illustrates code 300 representing a test template having a plurality of preconfigured points of entry capable of being utilized for customizing a test, in accordance with an embodiment. As an option, the code 300 may be implemented in the context of the functionality of FIGS. 1-2. Of course, however, the code 300 may be implemented in any desired environment. Again, the aforementioned definitions may apply during the present, description.

As shown, the code 300 representing the test template includes functions indicative of steps 302 for creating a package, exporting the package, creating a destination location for the package, installing the package, updating the package to create a new version of the package, exporting the new version of the package, and installing the new version of the package. Thus, the steps 302 may simulate the scenario of a lifecycle of the package, The code 300 representing the test template also includes a plurality of preconfigured points of entry 304 capable of being utilized to configure testing code for testing at least some of the aforementioned steps. As shown, each of the preconfigured points of entry 304 is a configurable function, such that code for testing a step associated with a preconfigured point of entry 304 may be inserted in the function. For example, the preconfigured point of entry 304 for use in testing the step of creating the package immediately follows the function for creating the package, and may be configured by inserting in the preconfigured point of entry 304 code for testing the creation of the package. In the embodiment shown, the preconfigured points of entry 304 are provided for testing the step creating the package, testing the step exporting the package, testing the step installing the package, testing the step updating the package to create the new version of the package, and testing the step installing the new version of the package.

Figure 4:
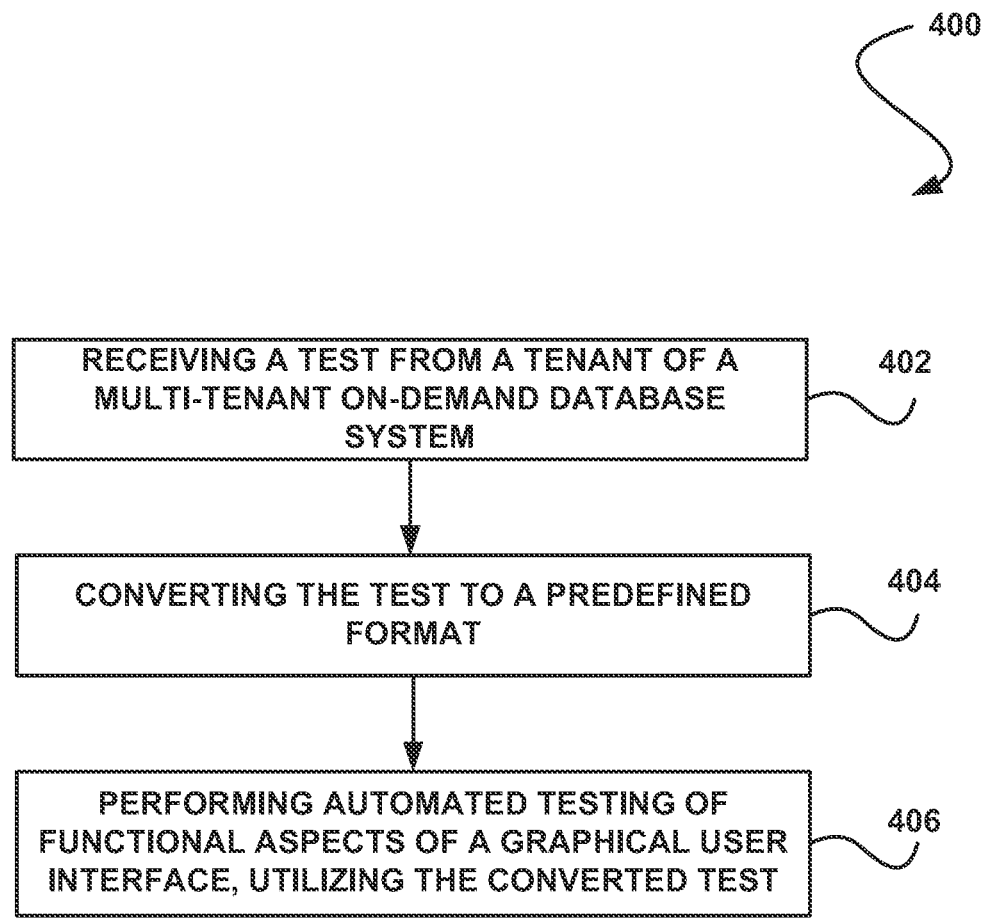
FIG. 4 illustrates a method for automated testing which includes a test converted to a predetermined format, in accordance with an embodiment.

FIG. 4 illustrates a method 400 for automated testing which includes a test converted to a predetermined format, in accordance with an embodiment. As an option, the present method 400 may be carried out in the context of the functionality of FIGS. 1-3. Of course, however, the method 400 may be carried out in any desired environment. Again, the aforementioned definitions may apply during the present description.

As shown in operation 402, a test is received. In the context of the present embodiment, the test includes any code for use in testing functional aspects of a graphical user interface (GU() For example, the test may be for use in testing code representing a GUI and the functionality within the GUI.

In one embodiment, the test may be received from a developer of the test. For example, the developer of the test may also be the developer of the code to be tested via the test. In another embodiment, the test may be received from a tenant of a multi-tenant on-demand database system. Further, the test may be received by the multi-tenant on-demand database system. Of course, however, the test may be received by any system via which the test is desired to be executed.

In addition, as shown in operation 404, the test is converted to a predefined forma With respect to the present embodiment, the predefined format includes any format that is executable by the receiver of the test. Thus, the predefined format may include a particular format that is supported by a system receiving the test.

In one embodiment, the test may be received in a first programming language associated with an integrated development environment (IDE) utilized by the developer of the test to develop the test. For example, the first programming language may include a format executable (i.e. supported) by a system of the developer. Thus, converting the test to the predefined format may include converting the test from the first programming language.

In another embodiment, the test may be converted to a second programming language specific to the receiver of the test. For example, the second programming language may include a format executable (i.e. supported) by a system of the receiver of the test. In this way, the unconverted test may be executable by the source from which the test is received, whereas the converted test may be executable by the receiver of the test.

In yet another embodiment, the test may be received in a format that is specific to a particular context (e.g. operating system, browser, etc.). Thus, converting the test to the predefined format may include converting the test from the format that is specific to the particular context. For example, the test may be converted to an abstract format that is unspecific to any particular context (and thus executable in a plurality of different contexts).

Furthermore, automated testing of functional aspects of a GUI is performed, utilizing the converted test. Note operation 206. In one embodiment, the functional aspects of the GUI may include any features of the GUI with which a user viewing the GUI may interact. Thus, the functional aspects of the GUI may include viewable features of the GUI. Just by way of example, the functional aspects of the GUI may include a user-selectable button, text automatically populated in a field in response to user input received by the GUI, etc.

It should be noted that the automated testing may include any testing (e.g. validation) of the functional aspects of the GUI which does not necessarily require manual input by a user. In one embodiment, the automated testing may include employing code to simulate user interaction with the functional aspects of the GUI (e.g. click, open, type, etc.), To this end, the automated testing of the functional aspects of the GUI may include automatically testing functionality of viewable features of the GUI.

Figure 5:
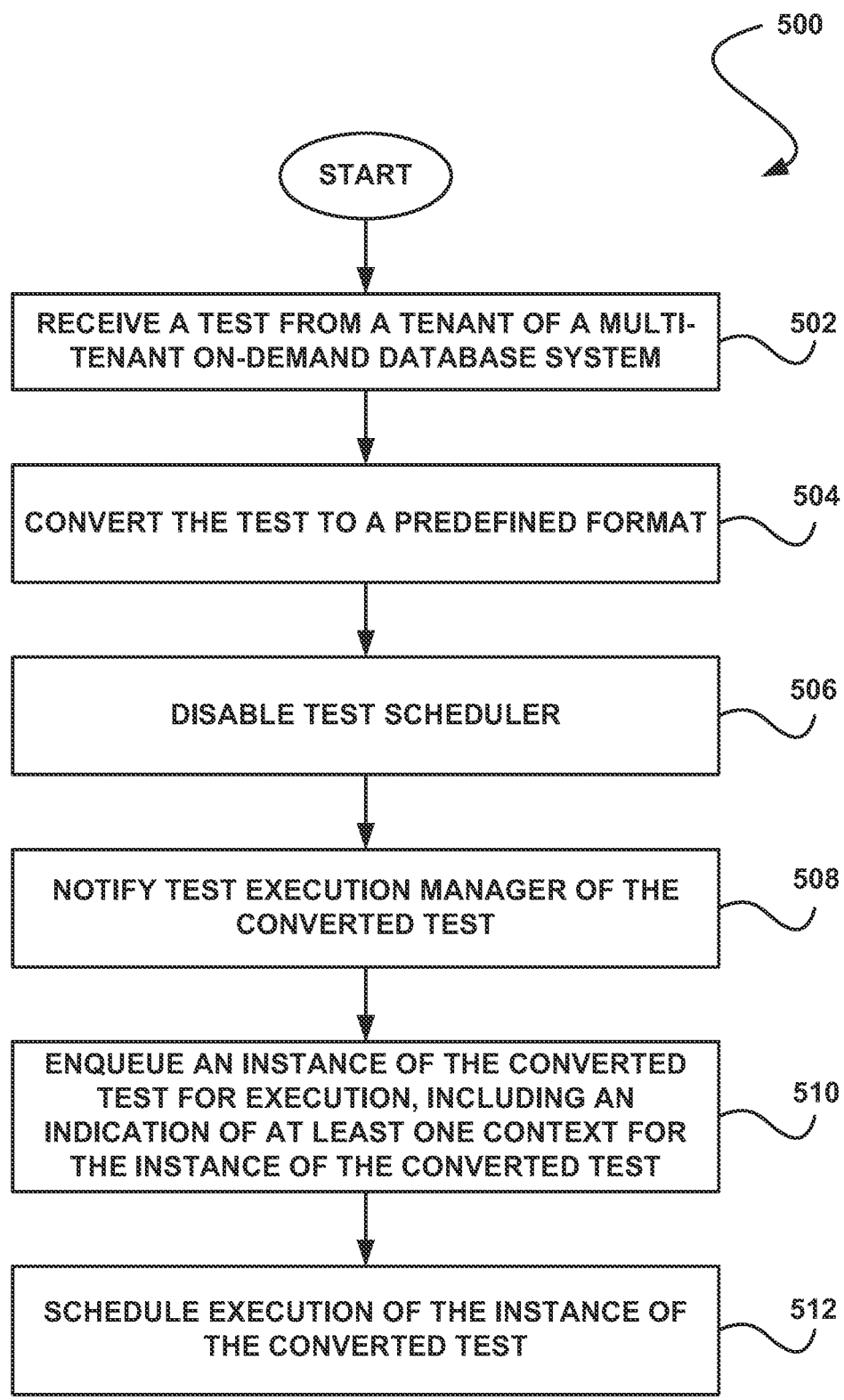
FIG. 5 illustrates a method for scheduling execution of a test converted to a predefined format, in accordance with an embodiment.

FIG. 5 illustrates a method 500 for scheduling execution of a test converted to a predefined format, in accordance with an embodiment. As an option, the present method 500 may be carried out in the context of the functionality of FIGS. 1-4. Of course, however, the method 200 may be carried out in any desired environment. Again, the aforementioned definitions may apply during the present description.

As shown in operation 502, a test is received from a tenant of a multi-tenant on-demand database system. In the present embodiment, the test is for testing functional aspects of a GUI, such as features of the GUI with which a user may interact. Further, the GUI may be developed by the tenant, and further the test may be developed by the tenant for use (e.g. by the tenant) in testing the GUI. Also in the present embodiment, the test is received by the multi-tenant on-demand database system.

In addition, as shown in operation 504, the test is converted to a predefined format. In one embodiment, the test may be converted from a format utilized by the tenant to develop the test to a format supported by the multi-tenant on-demand database system. As an option, the test may be converted utilizing a conversion tool of the multi-tenant on-demand database system, Furthermore, a test scheduler is disabled. Note operation 506. The test scheduler may include any component of code utilized for scheduling tests within the multi-tenant on-demand database system. For example, the test scheduler may schedule execution of the tests.

Still yet, as shown in operation 508, a test execution manager is notified of the converted test, In the present embodiment, the test execution manager includes a component of code utilized for managing execution of the converted tests. For example, as described below, the test execution manager may enqueue an instance of the converted test for scheduling by the test scheduler.

To this end, once the test execution manager is notified of the converted test, an instance of the converted test is enqueued for execution, including an indication of at least one context for the instance of the converted test. Note operation 510. For example, an instance of the converted test to be executed may be placed in a queue, whereby the test scheduler schedules the converted test by dequeueing the same for execution. As noted above, a context for the instance of the converted test is also included with the queued instance of the converted test, such that the context in which the converted test is to be executed may be identified and the converted test executed in such context. Such context may include the operating system, browser, etc. via which the converted test is to be executed.

Further, execution of the instance of the converted test is scheduled. Note operation 512. As noted above, such scheduling may be performed by the test scheduler, As also noted above, the scheduling may include dequeueing the instance of the converted test for execution.

Figure 6:
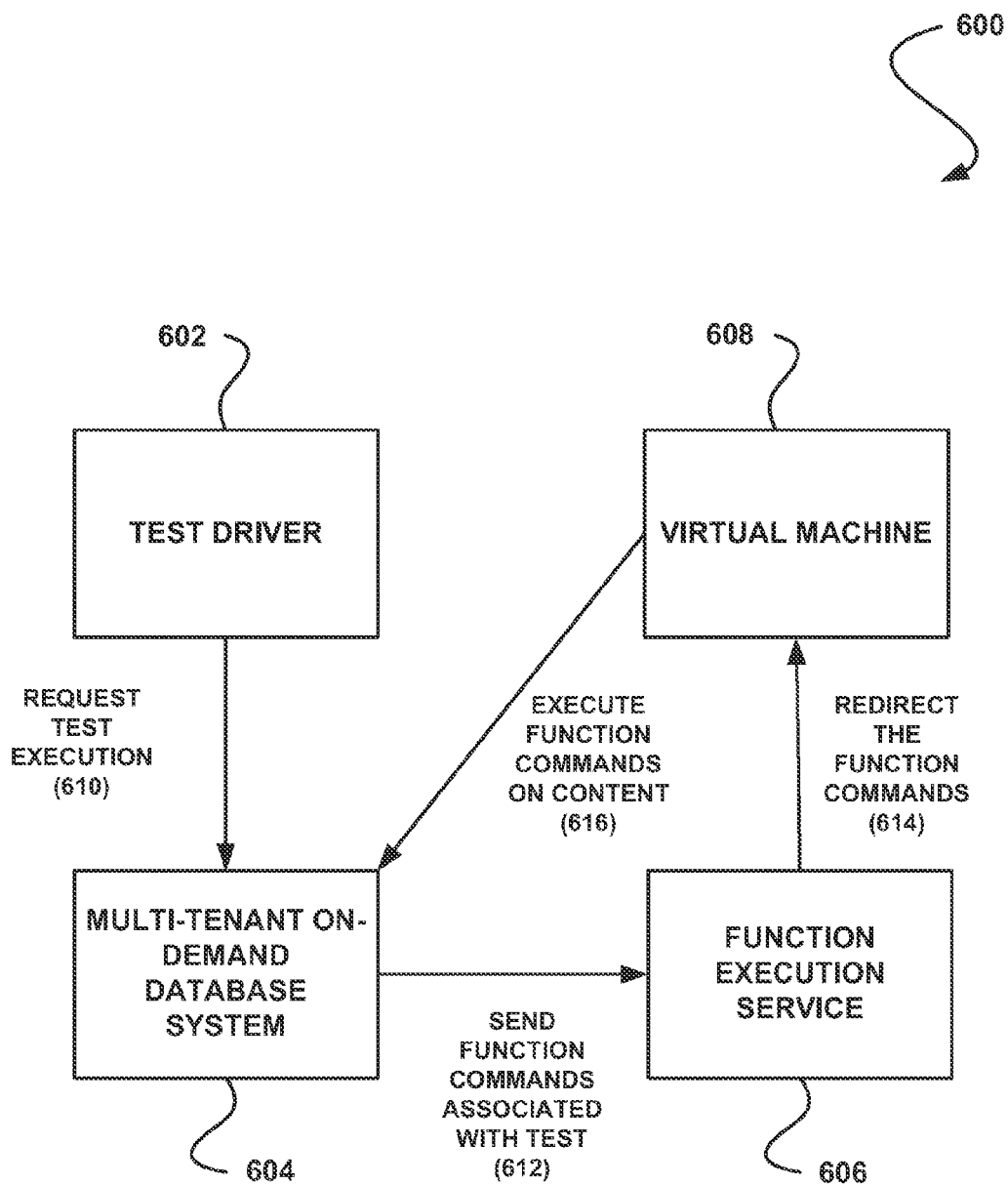
FIG. 6 illustrates a system for automated testing which includes a test converted to a predetermined format, in accordance with an embodiment.

FIG. 6 illustrates a system 600 for automated testing which includes a test converted to a predetermined format, in accordance with an embodiment. As an option, the system 600 may be implemented in the context of the functionality of FIGS. 1-5. Of course, however, the system 600 may be implemented in any desired environment. Again, the aforementioned definitions may apply during the present description.

As shown, a test driver 602 requests execution of a test (operation 610), In the context of the present embodiment, the test includes code for testing functional aspects of a GUI. Thus, the test may be specific to the test, and the request may include an identifier of the test, As also shown, the test driver 602 is a component of a system that is separate from a multi-tenant on-demand database system 604. For example, the test driver 602 may be component of a system utilizing by a tenant of the multi-tenant on-demand database system 604. Accordingly, the request may be received by the multi-tenant on-demand database system 604 from the test driver 602 via a network allowing communications between the test driver 602 and the multi-tenant on-demand database system 604.

In response to receipt of the request, the multi-tenant on-demand database system 604 sends function commands associated with the test to a function execution service 606 (see operation 612), The function commands may include any commands to execute functionality of the GUI. For example, the function commands may include commands to select a button on the GUI, enter text in a field of the GUI, etc.

Further, the function execution service 606 may include any service that is third party to the multi-tenant on-demand database system 604 and which is capable of initiating execution of the functionality of the GUI, Just by way of example, the function execution service 606 may be provided by Sauce Labs™. Of course, it should be noted that in another embodiment, the function execution service 606 may be internal to (Le. a component of) the multi-tenant on-demand database system 604.

The function execution service 606 redirects the function commands to a virtual machine 608 (see operation 614). In one embodiment, the function execution service 606 may forward the function commands to the virtual machine 608 employing a context (i.e. environment) in which the test driver 602 has requested that the test be executed. For example, the function execution service 606 may select the virtual machine 608 based on a determination that the virtual machine 608 is running an operating system, browser, and/or any other specific context in which the test driver 602 has requested that the test be executed.

The virtual machine 608 executes the function commands on content (see operation 616), where such content is the aforementioned GUI. For example, the virtual machine 608 may access the GUI via the multi-tenant on-demand database system 604. As an option, the virtual machine 608 may access the GUI on a copy of an organization of the multi-tenant on-demand database system 604 storing the GUI, Such copy may include a document object template (DOT) copy of the organization, which includes files defining metadata and/or data that makes up the organization. Thus, the copy of the GUI may be tested by the virtual machine 608.

In various embodiments, the function commands executed by the virtual machine 608 may navigate the GUI by employing the functionality of the GUI, for testing purposes, For example, results of the navigation may be recorded by the multi-tenant on-demand database system 604, such that it may be determined whether the results indicate that the functionality of the GUI is valid.

Figure 7:
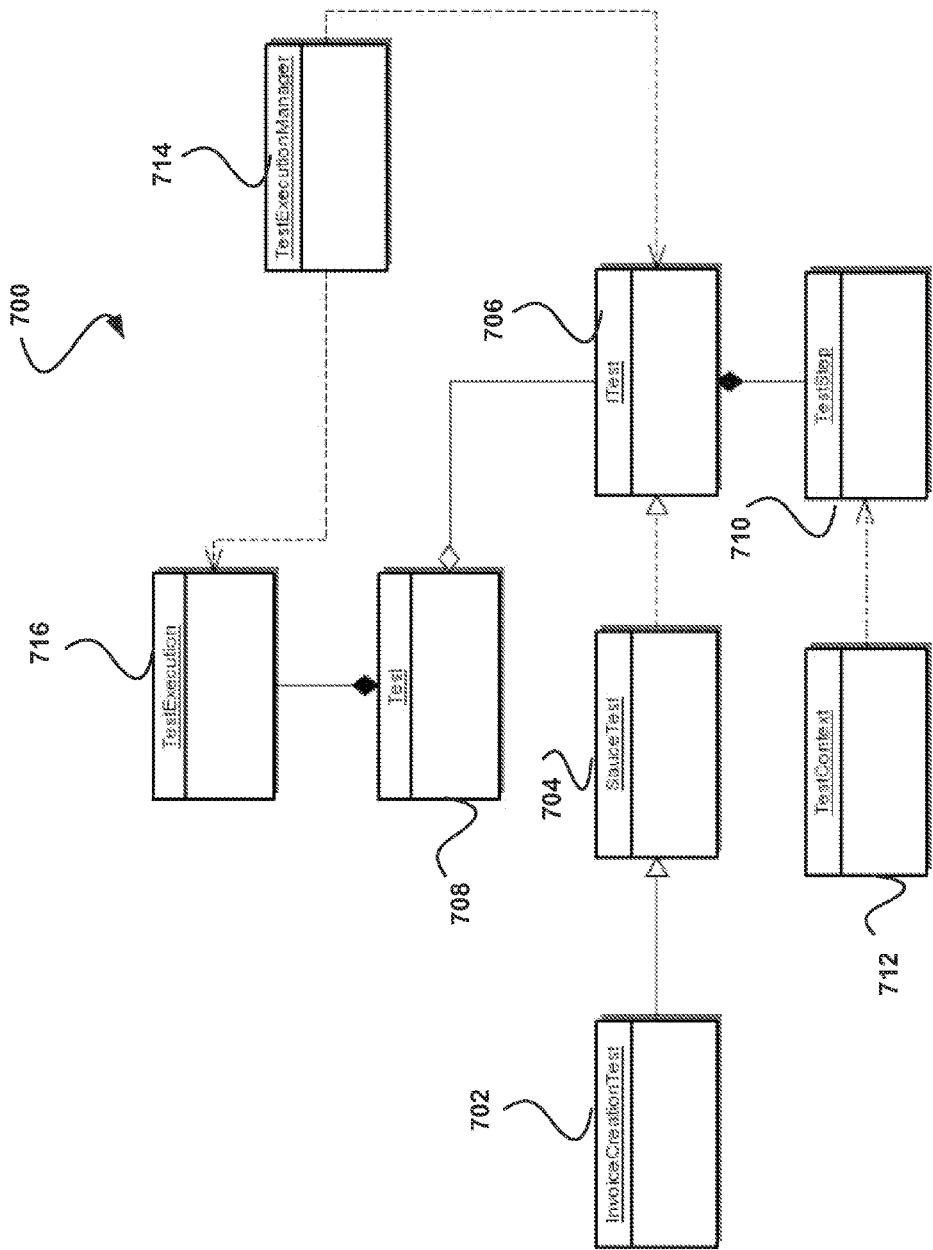
FIG. 7 illustrates classes for automated testing which includes a test converted to a predetermined format, in accordance with an embodiment.

FIG. 7 illustrates classes 700 for automated testing which includes a test converted to a predetermined format, in accordance with an embodiment. As an option, the classes 700 may be implemented in the context of the functionality of FIGS. 1-6. Of course, however, the classes 700 may be implemented in any desired environment. Again, the aforementioned definitions may apply during the present description.

In response to receipt of a test from a user, the test is converted (see converted test 702) into a predefined format, and a class for the converted test is created. In response to receipt of the converted test 702, a parent class 704 is identified to determine components of the converted test 702 that are inherited from the parent class 704. For example, the parent class 704 may contain functionality or data that is common to a plurality of other tests, including the converted test 702, which such other tests may utilize. Just by way of example the converted test 702 may inherit from the parent class 704 the context in which the converted test 702 is to be executed, a username/password for use in executing the converted test 702, etc.

A common interface 706 for calling steps of the test is instantiated. Further, n instance of the test (test instance 708)

is created and the test is executed (executed test instance 716), as described below. A test execution manager 714 identifies the test instance 708 and initiates execution of the test (executed test instance 716). For example, the test execution manager 714 may initiate execution of the test based on scheduling provided by a test scheduler (not shown). In one embodiment, the test execution manager 714 may initiate execution of the test by invoking a first step (i.e. function) of the test using a test step 710.

After each step in the test is completed, the test step 710 records a confirmation of completion of the step. A test context 712 then determines the next step to be performed, based on the information recorded by the test step 710. As an option, the test context 712 may be used for sharing information between the steps of the executed test instance 716, such as output from a first step that is utilized as input to a second step.

As an option, the test execution manager 714 may terminate execution of the test instance 708 prior to completion of the test instance 708. For example, the test execution manager 714 may allow the test instance 708 to be executed for a certain period of time (e.g. a predetermined period of time), and may then be terminated for allowing another test instance 708 to be executed. The test execution manager 714 may then restart execution of the test instance 706 at the point in which the test instance 708 was terminated. For example, the point in which the test instance 708 was terminated may be identified based on the information recorded by the test step 710 described above (i.e. the confirmation of the last completed step of the test). In a multi-tenant on-demand database system, starting and stopping the execution of the test instance 708 in this manner may avoid a single test of a tenant of the multi-tenant on-demand database system from consuming all resources of (he multi-tenant on-demand database system such that an additional test may be run in a similar manner to that described above while execution of the test instance 708 is stopped.

Figure 8:
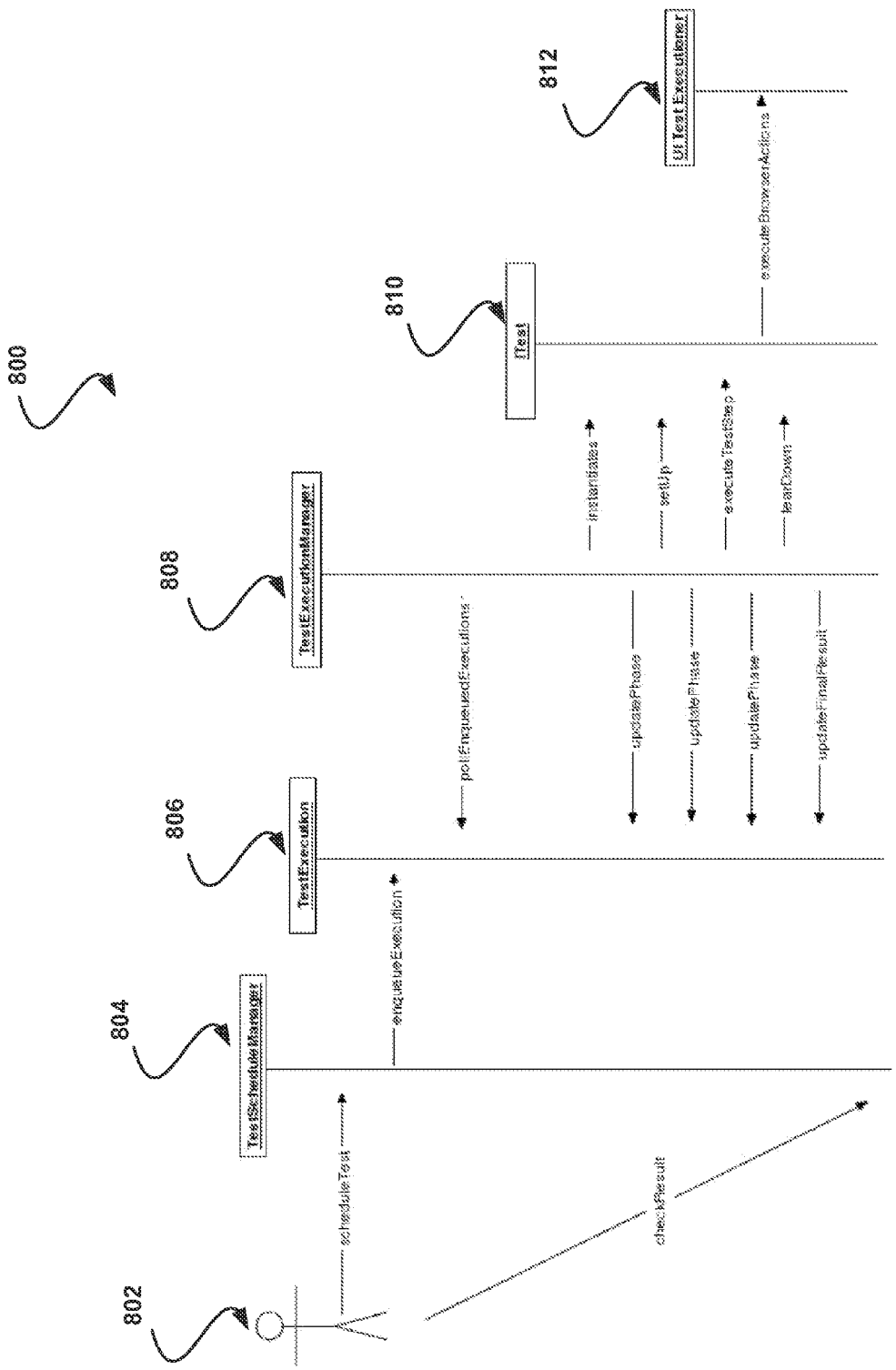
FIG. 8 illustrates a system for executing a scheduled test, in accordance with an embodiment.

FIG. 8 illustrates a system 800 for executing a scheduled test, in accordance with an embodiment. As an option, the system 800 may be implemented in the context of the functionality of FIGS. 1-7. Of course, however, the system 800 may be implemented in any desired environment. Again, the aforementioned definitions may apply during the present description.

As shown, a user 802 requests a test to be scheduled. In response to receipt of the request, a test schedule manager 804 enqueues the test for execution, which results in creation of an instance of the test 806 in a queue. A test execution manager 808 which continuously polls the queue to determine whether a test instance is stored in the queue retrieves the test instance from the queue and instantiates a common interface 810 for calling the steps (i.e. functions) of the test.

As shown, as each step in the test is performed, the test instance 806 is updated by the test execution manager 808 to confirm completion of the step (shown as "updatePhase"). This confirmation may be utilized for stopping the test prior to completion of the test and restarting the test at the point of the termination. For example, the last confirmed completed step may be identified from the test instance 806 for restarting the test when terminated prior to completion of the test, In addition, after confirmation of completion of a step, the test execution manager 808 instructs the common interface 810 to perform a next step in the test. As shown, the instruction may be to set up a GUI being tested. Another step may be to execute a step of the test for testing the GUI. Where the step is to test functionality of the GUI, the common interface 810 may command a user interface test executioner 812 to execute the functionality (i.e. browser actions as shown), such as clicking a button on the GUI, etc. The last step may be to tear down the GUI, and the confirmation of completion of the final step may be to store confirmation of a final result of the test in the test instance 806. In this way, the user 802 may check the final result of the test via the test scheduler manager 804 which accesses the final result stored in the test instance 806.

System Overview

Figure 9:
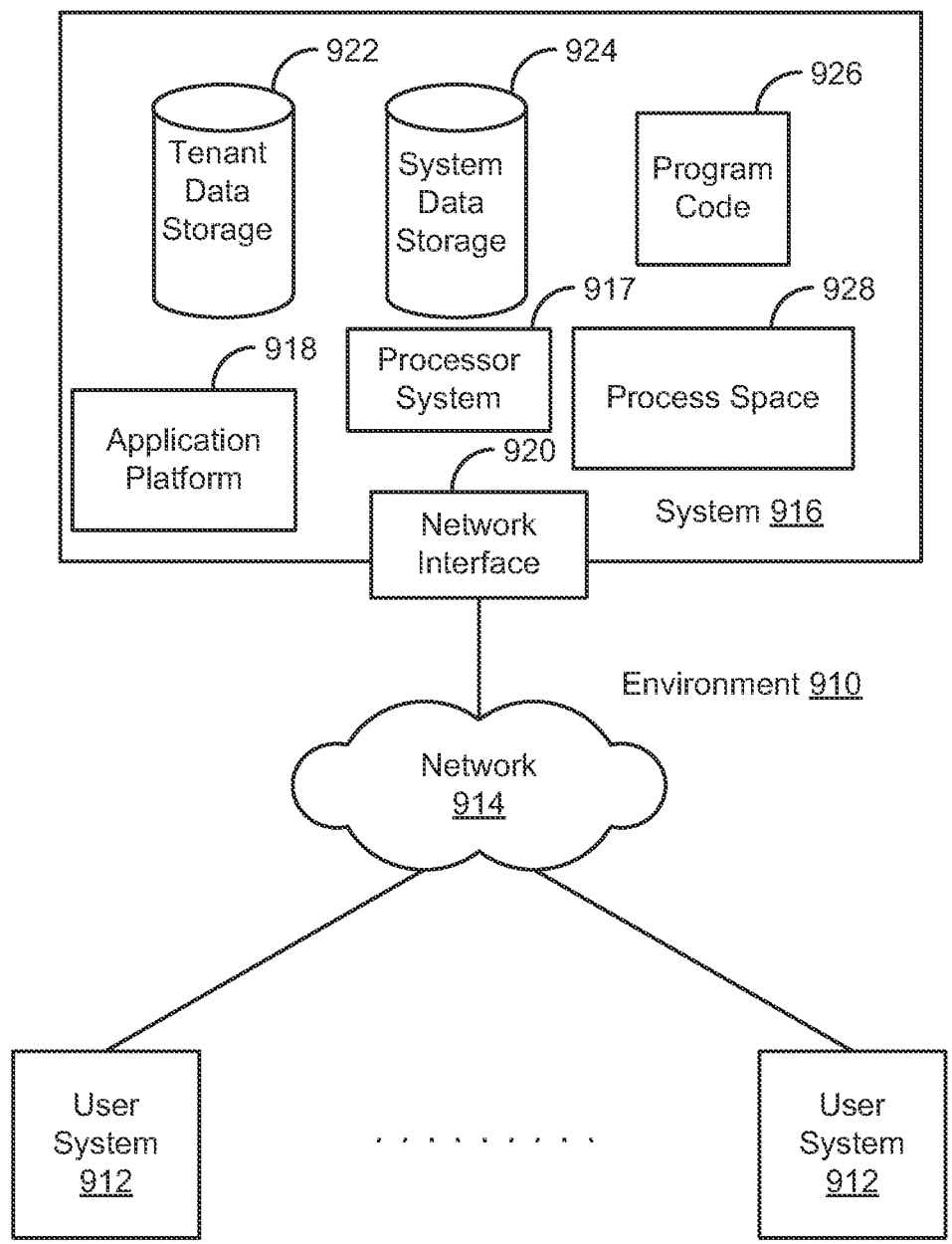
FIG. 9 illustrates a block diagram of an example of an environment wherein an on-demand database service might be used.

FIG. 9 illustrates a block diagram of an environment 910 wherein an on-demand database service might be used. Environment 910 may include user systems 912, network 914, system 916, processor system 917, application platform 918, network interface 920, tenant data storage 922, system data storage 924, program code 926, and process space 928, In other embodiments, environment 910 may not have all of the components listed and/or may have other elements instead of, or in addition to, those listed above.

Environment 910 is an environment in which an on-demand database service exists. User system 912 may be any machine or system that is used by a user to access a database user system. For example, any of user systems 912 can be a handheld computing device, a mobile phone, a laptop computer, a work station, and/or a network of computing devices. As illustrated in FIG. 9 (and in more detail in FIG. 10) user systems 912 might interact via a network 914 with an on-demand database service, which is system 916.

An on-demand database service, such as system 916, is a database system that is made available to outside users that do not need to necessarily be concerned with building and/or maintaining the database system, hut instead may be available for their use when the users need the database system (e.g., on the demand of the users). Some on-demand database services may store information from one or more tenants stored into tables of a common database image to form a multi-tenant database system (MTS), Accordingly, "on-demand database service 916" and "system 916" will be used interchangeably herein. A database image may include one or more database objects. A relational database management system (RDMS) or the equivalent may execute storage and retrieval of information against the database object(s). Application platform 918 may be a framework that allows the applications of system 916 to run, such as the hardware and/or software, e.g., the operating system. In an embodiment, on-demand database service 916 may include an application platform 918 that enables creation, managing and executing one or more applications developed by the provider of the on-demand database service, users accessing the on-demand database service via user systems 912, or third party application developers accessing the on-demand database service via user systems 912.

The users of user systems 912 may differ in their respective capacities, and the capacity of a particular user system 912 might be entirely determined by permissions (permission levels) for the current user. For example, where a salesperson is using a particular user system 912 to interact with system 916, that user system has the capacities allotted to that salesperson. However, while an administrator is using that user system to interact with system 916, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 914 is any network or combination of networks of devices that communicate with one another. For example, network 914 can he any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

User systems 912 might communicate with system 916 using TCP/IP and, at a higher network level, use other common Internet protocols to communicate, such as HTTP, FTP, AFS, WAP, etc. In an example where HTTP is used, user system 912 might include an HTTP client commonly referred to as a "browser" for sending and receiving HTTP messages to and from an HTTP server at system 916. Such an HTTP server might be implemented as the sole network interface between system 916 and network 914, but other techniques might be used as well or instead. In some implementations, the interface between system 916 and network 914 includes load sharing functionality, such as round-robin HTTP request distributors to balance loads and distribute incoming HTTP requests evenly over a plurality of servers. At least as for the users that are accessing that server, each of the plurality of servers has access to the MTS' data however, other alternative configurations may be used instead, In one embodiment, system 916, shown in FIG. 9, implements a web-based customer relationship management (CRM) system, For example, in one embodiment, system 916 includes application servers configured to implement and execute CRM software applications as well as provide related data, code, forms, webpages and other information to and from user systems 912 and to store to, and retrieve from, a database system related data, objects, and Webpage content, With a multi-tenant system, data for multiple tenants may he stored in the same physical database object, however, tenant data typically is arranged so that data of one tenant is kept logically separate from that of other tenants so that one tenant does not have access to another tenant's data, unless such data is expressly shared. In certain embodiments, system 916 implements applications other than, or in addition to, a CRM application. For example, system 916 may provide tenant access to multiple hosted (standard and custom) applications, including a CRM application. User (or third party developer) applications, which may or may not include CRM, may be supported by the application platform 918, which manages creation, storage of the applications into one or more database objects and executing of the applications in a virtual machine in the process space of the system 916.

One arrangement for elements of system 916 is shown in FIG. 9, including a network interface 920, application platform 918, tenant data storage 922 for tenant data 923, system data storage 924 for system data 925 accessible to system 916 and possibly multiple tenants, program code 926 for implementing various functions of system 916, and a process space 928 for executing MTS system processes and tenant-specific processes, such as running applications as part of an application hosting service. Additional processes that may execute on system 916 include database indexing processes.

Several elements in the system shown in FIG. 9 include conventional, well-known elements that are explained only briefly here, For example, each user system 912 could include a desktop personal computer, workstation, laptop, PDA, cell phone, or any wireless access protocol (WAP) enabled device or any other computing device capable of interfacing directly or indirectly to the Internet or other network connection. User system 912 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 912 to access, process and view information, pages and applications available to it from system 916 over network 914. Each user system 912 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 916 or other systems or servers. For example, the user interface device can be used to access data and applications hosted by system 916, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 912 and all of its components are operator configurable using applications, such as a browser, including computer code run using a central processing unit such as an Intel Pentium® processor or the like. Similarly, system 916 (and additional instances of an MTS, where more than one is present) and all of their components might be operator configurable using application(s) including computer code to run using a central processing unit such as processor system 917, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein, Computer code for operating and configuring system 916 to intercommunicate and to process webpages, applications and other data and media content as described herein are preferably downloaded and stored on a hard disk, hut the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data, Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well. known may be used. (Java™ is a trademark of Sun Microsystems, Inc.).

According to one embodiment, each system 916 is configured to provide webpages, forms, applications, data and media content to user (client) systems 912 to support the access by user systems 912 as tenants of system 916. As such, system 916 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 10:
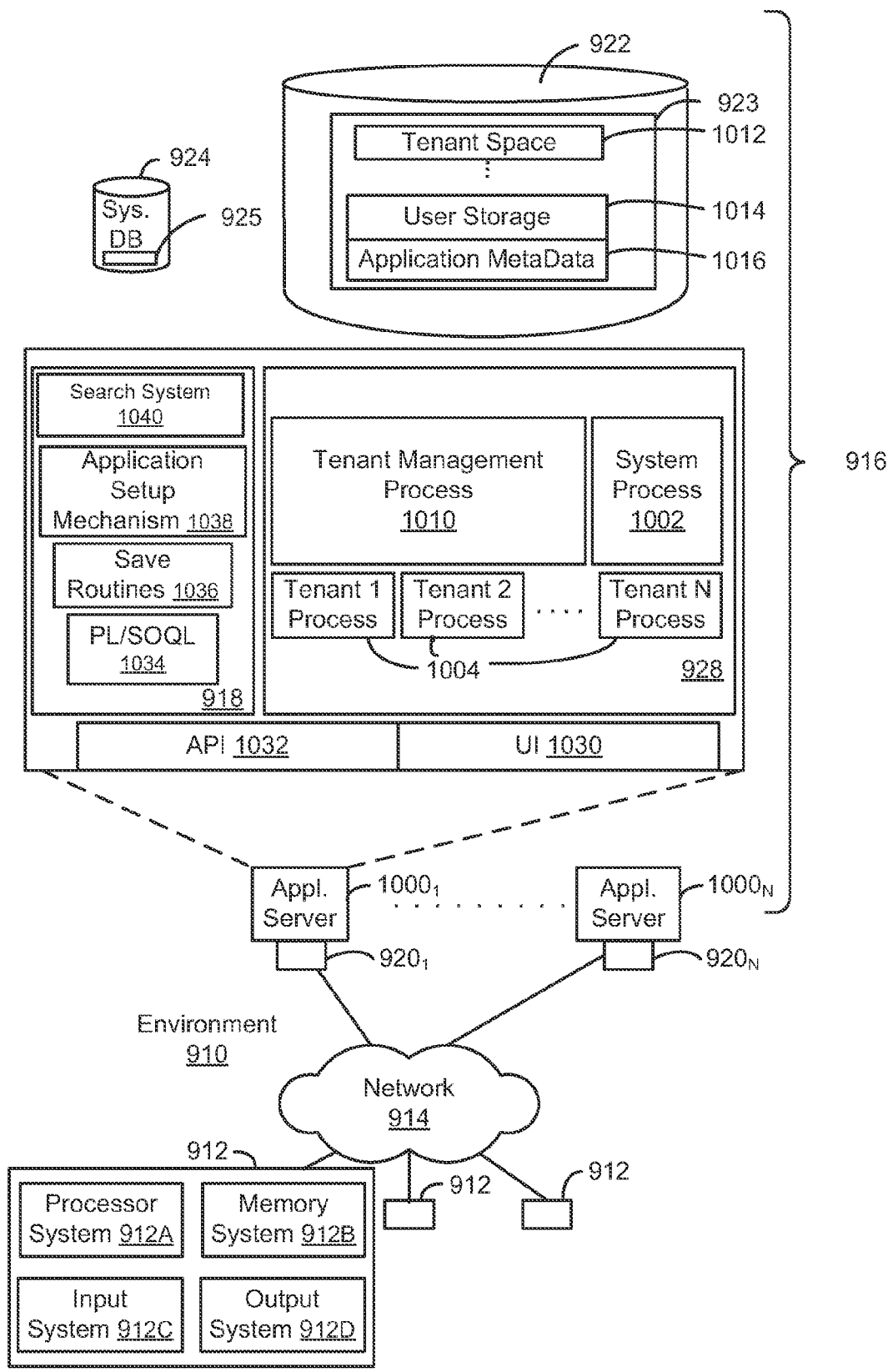
FIG. 10 illustrates a block diagram of an embodiment of elements of FIG. 9 and various possible interconnections between these elements.

FIG. 10 also illustrates environment 910. However, in FIG. 10 elements of system 916 and various interconnections in an embodiment are further illustrated. FIG. 10 shows that user system 912 may include processor system 912A, memory system 912B, input system 912C, and output system 912D. FIG. 10 shows network 914 and system 916. FIG. 10 also shows that system 916 may include tenant data storage 922, tenant data 923, system data storage 924, system data 925, User Interface (UI) 1030, Application Program Interface (API) 1032, PL/SOQL 1034, save routines 1036, application setup mechanism 1038, applications servers $1000_1$-$1000_N$, system process space 1002, tenant process spaces 1004, tenant management process space 1010, tenant storage area 1012, user storage 1014, and application metadata 1016. In other embodiments, environment 91.0 may not have the same elements as those listed above and/or may have other elements instead of, or in addition to, those listed above.

User system 912, network 914, system 916, tenant data storage 922, and system data storage 924 were discussed above in FIG. 9. Regarding user system 912, processor system 912A may be any combination of one or more processors. Memory system 912B may be any combination of one or more memory devices, short term, and/or long term memory. Input system 912C may be any combination of input devices, such as one or more keyboards, mice, trackballs, scanners, cameras, and/or interfaces to networks. Output system 912D may be any combination of output devices, such as one or more monitors, printers, and/or interfaces to networks. As shown by FIG. 10, system 916 may include a network interface 920 (of FIG. 9) implemented as a set of HTTP application servers 1000, an application platform 918, tenant data storage 922, and system data storage 924. Also shown is system process space 1002, including individual tenant process spaces 1004 and a tenant management process space 1010. Each application server 1000 may be configured to tenant data storage 922 and the tenant data 923 therein, and system data storage 924 and the system data 925 therein to serve requests of user systems 912. The tenant data 923 might be divided into individual tenant storage areas 1012, which can be either a physical arrangement and/or a logical arrangement of data. Within each tenant storage area 1012, user storage 1014 and application metadata 1016 might be similarly allocated for each user. For example, a copy of a user's most recently used (MRU) items might be stored to user storage 1014. Similarly, a copy of MRU items for an entire organization that is a tenant might be stored to tenant storage area 1012. A UI 1030 provides a user interface and an API 1032 provides an application programmer interface to system 916 resident processes to users and/or developers at user systems 912. The tenant data and the system data may be stored in various databases, such as one or more Oracle™ databases.

Application platform 918 includes an application setup mechanism 1038 that supports application developers' creation and management of applications, which may be saved as metadata into tenant data storage 922 by save routines 1036 for execution by subscribers as one or more tenant process spaces 1004 managed by tenant management process 1010 for example. Invocations to such applications may be coded using PL/SOQL 1034 that provides a programming language style interface extension to API 1032. A detailed description of some PL/SOQL language embodiments is discussed in commonly owned co-pending U.S. Provisional Patent Application 60/828,192 entitled, PROGRAMMING LANGUAGE METHOD AND SYSTEM FOR EXTENDING APIS TO EXECUTE IN CONJUNCTION WITH DATABASE APIS, by Craig Weissman, filed Oct. 4, 2006, which is incorporated in its entirety herein for all purposes. Invocations to applications may be detected by one or more system processes, which manages retrieving application metadata 1016 for the subscriber making the invocation and executing the metadata as an application in a virtual machine.

Each application server 1000 may be communicably coupled to database systems, e.g., having access to system data 925 and tenant data 923, via a different network connection. For example, one application server $1000_1$ might be coupled via the network 914 (e.g., the Internet), another application server $1000_{N-1}$ might be coupled via a direct network link, and another application server $1000_N$ might be coupled by yet a different network connection. Transfer Control Protocol and Internet Protocol (TCP/IP) are typical protocols for communicating between application servers 1000 and the database system. However, it will be apparent to one skilled in the art that other transport protocols may be used to optimize the system depending on the network interconnect used.

In certain embodiments, each application server 1000 is configured to handle requests for any user associated with any organization that is a tenant. Because it is desirable to be able to add and remove application servers from the server pool at any time for any reason, there is preferably no server affinity for a user and/or organization to a specific application server 1000. In one embodiment, therefore, an interface system implementing a load balancing function (e.g., an F5 Big-IP load balancer) is communicably coupled between the application servers 1000 and the user systems 912 to distribute requests to the application servers 1000. In one embodiment, the load balancer uses a least connections algorithm to route user requests to the application servers 1000. Other examples of load balancing algorithms, such as round robin and observed response time, also can be used. For example, in certain embodiments, three consecutive requests from the same user could hit three different application servers 1000, and three requests from different users could hit the same application server 1000. In this manner, system 916 is multi-tenant, wherein system 916 handles storage of, and access to, different objects, data and applications across disparate users and organizations, As an example of storage, one tenant might be a company that employs a sales force where each salesperson uses system 916 to manage their sales process. Thus, a user might maintain contact data, leads data, customer follow-up data, performance data, goals and progress data, etc., all applicable to that user's personal sales process (e.g., in tenant data storage 922). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide. data shared or accessible by a plurality of users or all of the users for a given organization that is a tenant. Thus, there might be some data structures managed by system 916 that are allocated at the tenant level while other data structures might be managed at the user level, Because an MTS might support multiple tenants including possible competitors, the MIS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 916 might also maintain system level data usable by multiple tenants or other data, Such system level data might include industry reports, news, postings, and the like that are sharable among tenants.

In certain embodiments, user systems 912 (which may be client systems) communicate with application servers 1000 to request and update system-level and tenant-level data from system 916 that may require sending one or more queries to tenant data storage 922 and/or system data storage 924. System 916 an application server 1000 in system 916) automatically generates one or more SQL statements (e.g., one or more SQL queries) that are designed to access the desired information. System data storage 924 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as encompass all such modifications and similar arrangements.

The invention claimed is:

1. A computer program product, comprising a non-transitory computer usable medium having a computer readable program code embodied therein, the computer readable program code adapted to be executed to implement a method for automated testing which utilizes a preconfigured point of entry in a test, the method comprising:
   identifying a test template specific to a scenario having a sequence of steps, where the test template includes:
      a plurality of functions, where each of the plurality of functions simulates one of the sequence of steps in the scenario, and
      one or more preconfigured points of entry, where each preconfigured point of entry in the test template includes an empty function that is associated with at least one of the functions each simulating one of the sequence of steps in the scenario, for enabling testing of the associated at least one of the functions;
   identifying, within the test template, one of the preconfigured points of entry; and
   customizing the test template by inserting testing code into the empty function of the identified preconfigured point of entry, the testing code for use in automatically testing the at least one of the functions associated with the identified preconfigured point of entry.

2. The computer program product of claim 1, wherein the preconfigured point of entry is associated with the at least one of the functions by being subsequent to the at least one of the functions during execution.

3. A method, comprising:
   identifying a test template specific to a scenario having a sequence of steps, where the test template includes:
      a plurality of functions. where each of the plurality of functions simulates one of the sequence of steps in the scenario, and
      one or more preconfigured points of entry, where each preconfigured point of entry in the test template includes an empty function that is associated with at least one of the functions each simulating one of the sequence of steps in the scenario, for enabling testing of the associated at least one of the functions;

identifying, within the test template, one of the preconfigured points of entry: and using a processor, customizing the test template by inserting testing code into the empty function of the identified preconfigured point of entry, the testing code for use in automatically testing the at least one of the functions associated with the identified preconfigured point of entry.

4. An apparatus, comprising:

a processor for:

identifying a test template specific to a scenario having a sequence of steps, where the test template includes a plurality of functions, where each of the plurality of functions simulates one of the sequence of steps in the scenario, and one or more preconfigured points of entry, where each preconfigured point of entry in the test template includes an empty function that is associated with at least one of the functions each simulating one of the sequence of steps in the scenario, for enabling testing of the associated at least one of the functions;

identifying, within the test template, one of the preconfigured points of entry; and customizing the test template by inserting testing code into the empty function of the identified preconfigured point of entry, the testing code for use in automatically testing the at least one of the functions associated with the identified preconfigured point of entry.

5. A method for transmitting code, comprising:

transmitting code to identify a test template specific to a scenario having a sequence of steps, where the test template includes:

a plurality of functions, where each of the plurality of functions simulates one of the sequence of steps in the scenario, and one or more preconfigured points of entry, where each preconfigured point of entry in the test template includes an empty function that is associated with at least one of the functions each simulating one of the sequence of steps in the scenario, for enabling testing of the associated at least one of the functions;

transmitting code to identify, within the test template, one of the preconfigured points of entry; and transmitting code to customize the test template, using a processor, by inserting testing code into the empty function of the identified preconfigured point of entry, the testing code for use in automatically testing the at least one of the functions associated with the identified preconfigured point of entry.

6. The computer program product of claim 1, wherein the user identifies the preconfigured point of entry using documentation associated with the test template indicating that the preconfigured point of entry is associated with a particular one of the functions.

7. The computer program product of claim 1, wherein each preconfigured point of entry is utilized for testing only the function simulating a step that is located immediately prior to the preconfigured point of entry in the test template.

8. The computer program product of claim 1, wherein each preconfigured point of entry is utilized for testing any of the functions simulating the steps that are located prior to the preconfigured point of entry in the test template.

9. The computer program product of claim 1, wherein the testing code inserted into the empty function of the identified preconfigured point of entry overrides a functionality of the at least one of the functions associated with the identified preconfigured point of entry.

10. The computer program product of claim 1, further comprising;

receiving the customized test template at a system;

converting the customized test template to a predefined format to create a converted test, where the predefined format is supported by the system;

disabling a test scheduler of the system;

notifying a test execution manager of the converted test;

adding an instance of the converted test to a queue for execution, where a context for the instance of the converted test is included with the queued instance of the converted test;

removing the instance of the converted test from the queue for execution; and scheduling an execution of the instance of the converted test.

* * * * *